United States Patent [19]

Okada et al.

[11] Patent Number: 5,769,204
[45] Date of Patent: Jun. 23, 1998

[54] SINGULATOR CONVEYOR SYSTEM HAVING PACKAGE-RETURN CONVEYORS

[75] Inventors: Goro Okada; Edward Ydoate, both of Louisville, Ky.

[73] Assignee: Sandvik Sorting Systems, Inc., Louisville, Ky.

[21] Appl. No.: 576,474

[22] Filed: Dec. 21, 1995

[51] Int. Cl.$^6$ .................................................. B65G 47/22
[52] U.S. Cl. .......................... 198/443; 198/455; 198/580
[58] Field of Search ................................... 198/443, 454, 198/455, 580

[56] References Cited

U.S. PATENT DOCUMENTS

| | | | |
|---|---|---|---|
| 2,763,359 | 9/1956 | Rose | 198/455 |
| 3,232,411 | 2/1966 | Kulig | 198/580 |
| 3,604,551 | 9/1971 | Fink . | |
| 4,037,710 | 7/1977 | Brutcher . | |
| 4,039,074 | 8/1977 | Maxted . | |
| 4,054,199 | 10/1977 | Polderman | 198/580 |
| 5,103,962 | 4/1992 | Voss et al. | 198/443 |
| 5,147,023 | 9/1992 | Meindl | 198/454 |
| 5,222,586 | 6/1993 | Ydoate et al. . | |
| 5,240,101 | 8/1993 | LeMay et al. . | |
| 5,372,236 | 12/1994 | Layer | 198/443 |
| 5,372,238 | 12/1994 | Bonnet . | |

*Primary Examiner*—Karen B. Merritt
*Assistant Examiner*—Gregory A. Morse
*Attorney, Agent, or Firm*—Burns, Doane, Swecker & Mathis, L.L.P.

[57] ABSTRACT

A singulator conveyor receives randomly oriented articles and positions those articles in single file. The conveyor includes skewed rollers for driving articles longitudinally and laterally against a side wall. The width of the singulator conveyor becomes gradually stepped-down, and a return conveyor system is provided which includes secondary return conveyors or chutes disposed at respective ones of the steps for receiving excessive articles from the singulator conveyor and delivering them to a main return conveyor which returns the articles to an upstream end of the singulator conveyor.

9 Claims, 2 Drawing Sheets

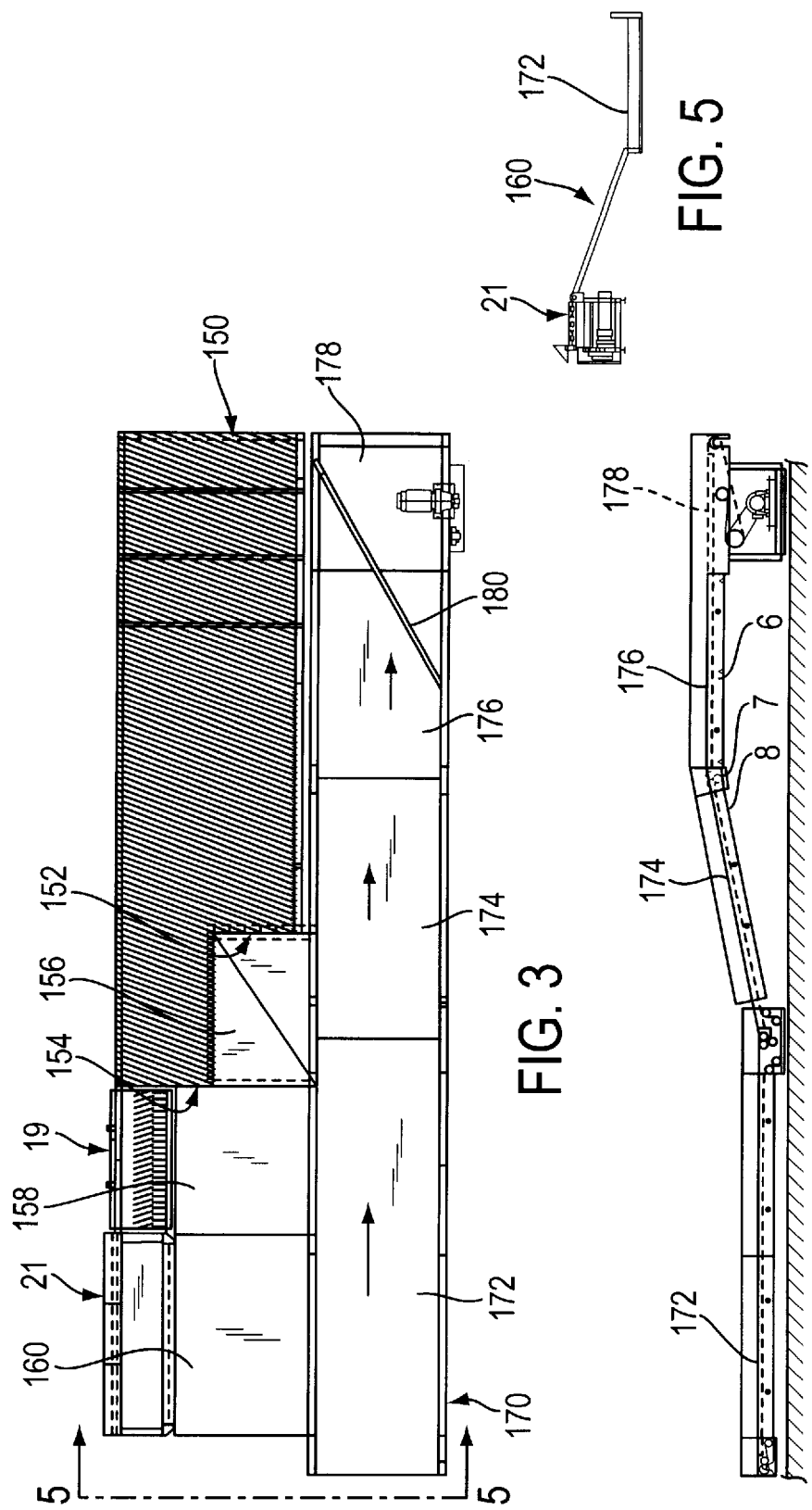

SINGULATOR CONVEYOR SYSTEM HAVING PACKAGE-RETURN CONVEYORS

BACKGROUND OF THE INVENTION

The present invention relates to the unscrambling of randomly arranged articles, such as packages, into a single column.

It is known to provide a conveying system which receives a flow of randomly arranged articles, such as packages to be mailed, and orients the packages into a single file so that the packages can be fed one-at-a-time to a sorter mechanism which reads a code on each package and then diverts the packages to particular stations in response to the data read from the code, e.g., a mailing address.

A conventional conveying system 18 depicted in FIG. 1 comprises an unscrambler or singulator conveyor which has a series of driven rollers 11 for receiving and advancing randomly oriented packages. The rollers are arranged in longitudinally successive groups, with the rollers of each group being rotated at a common speed which is faster than the speed of the previous (upstream) group of rollers. As a result, upon reaching a group of faster rollers, packages are accelerated relative to packages traveling immediately therebehind in order to create gaps which can be filled-in by other packages for creating the single file.

That filling-in is achieved due to the fact that the rollers are skewed so as to impart a lateral force to the packages, tending to direct them sidewards against a side wall 13 as they are being advanced. Hence, the single file is established along that wall.

Prior to reaching the sorter, the packages exiting the singulator conveyor traverse a package-removal apparatus intended to reject any packages not in the single file, i.e., packages which have not been singulated, but which are traveling abreast of the single file. Those rejected packages are then recirculated back to the inlet of the singulator conveyor.

As the system is operating, the quantity of packages being handled may vary. It is not uncommon for a sudden surge in the quantity of packages to temporarily overwhelm the system, whereupon many packages do not become singulated and thus jam the package-removal apparatus which is typically unable to handle a high volume of non-singulated packages. Also, the large number of non-singulated packages increases the chance for a non-singulated package to successfully traverse the package-removal apparatus and thus interfere with proper operation of the sorter mechanism located downstream thereof.

SUMMARY OF THE INVENTION

The present invention relates to a conveyor system for arranging randomly oriented articles into a single file traveling in a longitudinal direction. The system includes a vertical side wall, a singulator conveyor section, a secondary return portion, and a driven main return conveyor. The singulator conveyor section includes a plurality of driven rollers upon which the articles ride. The rollers are arranged in longitudinally successive groups, with the rollers of each group being driven at a faster speed than a preceding group. The rollers are skewed to urge the articles in a direction having a longitudinal component directed toward a conveyor discharge end, and a lateral component directed toward the side wall. The rollers include inside ends disposed proximate the side wall, and outside ends disposed remote from the side wall. Some of the rollers are of shorter width than respective preceding rollers to form steps between those rollers. The secondary return portion is arranged at the steps for guiding excess packages in a generally lateral direction away from the side wall. The driven main return conveyor is arranged to receive packages from the secondary return portion for returning the packages to an upstream end of the singulator conveyor system.

BRIEF DESCRIPTION OF THE DRAWINGS

The objects and advantages of the invention will become apparent from the following detailed description of preferred embodiments thereof if connection with the accompanying drawings in which like numerals designate like elements and in which:

FIG. 3 is a schematic top plan view of a singulator conveyor system according to a second embodiment of the present invention;

FIG. 4 is a side elevational view of FIG. 3; and

FIG. 5 is an end view of FIG. 3 taken along the line 5—5 therein.

DETAILED DESCRIPTION OF PREFERRED EMBODIMENTS OF THE INVENTION

Figure 1:
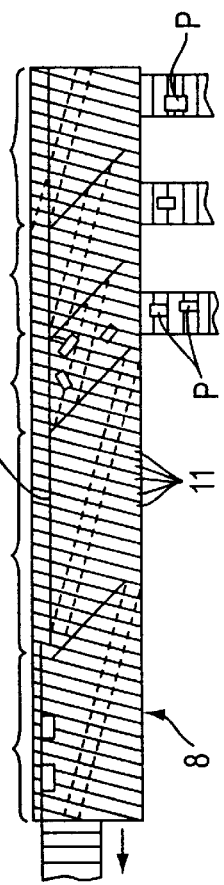
FIG. 1 is a schematic top plan view of a prior art singulator conveyor system.
Figure 2:
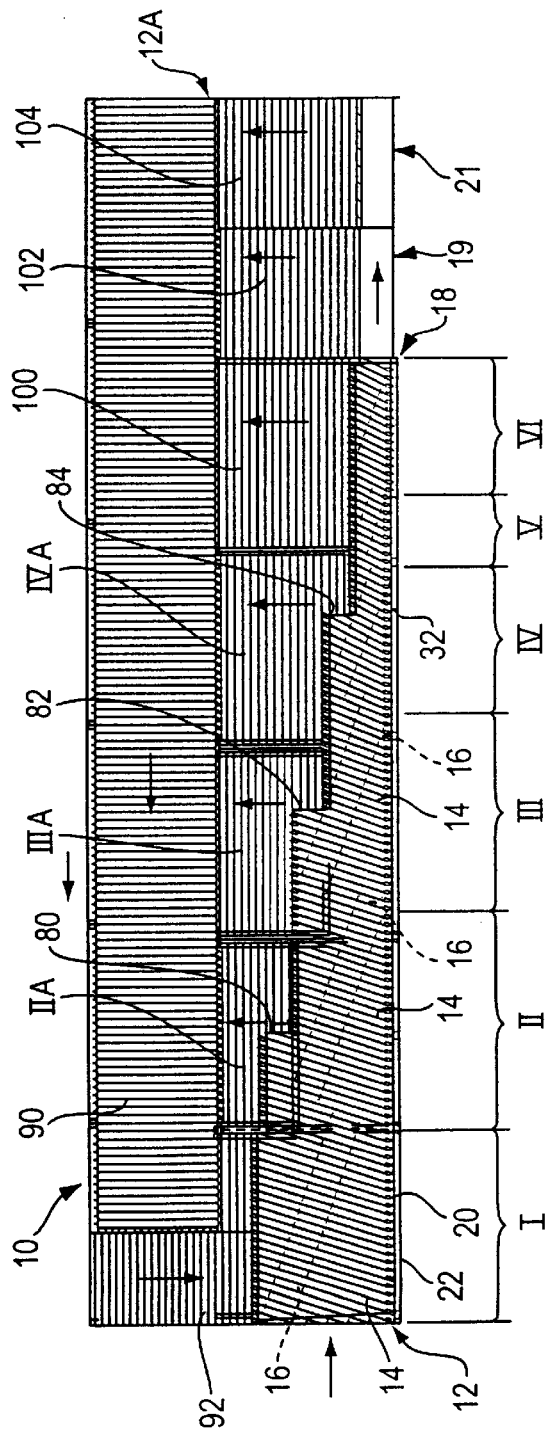
FIG. 2 is a schematic top plan view of a singulator conveyor system according to a first embodiment of the present invention.

Depicted in FIG. 2 is a first embodiment of a conveyor system 10 comprising a singular conveyor section 12 and a return conveyor section 12A. The singular conveyor section 12 comprises longitudinally successive groups I to VI of rollers 14 driven in the conventional manner, i.e., by drive mechanisms (belts) 16 located beneath the rollers. The groups of rollers are driven at progressively increasing speeds for the purpose of creating longitudinal gaps between articles, e.g., packages that are being conveyed longitudinally toward an outlet end 18 of the singulator, conveyor section. That is, roller group II is driven at a faster speed than rather group I, etc.

Situated at the outlet end 18 of the conveyor is a removal conveyor 19 of the type disclosed in U.S. application Ser. No. 08/388,450 filed Feb. 14, 1995 by Joseph T. Boone and a flow control conveyor 21 of the type described in U.S. Pat. No. 5,222,586, the disclosures of which are incorporated by reference herein.

The rollers include inside ends 20 which terminate adjacent a fixed vertical side wall 22.

It may occur that the quantity of packages traveling along the singulator conveyor section 12 exceeds the capacity thereof. That is, a temporary surge of package inflow may create such a condition. In order to deal with such a condition, a return conveyor arrangement is provided. In that regard, the lengths of the rollers 14 in the various groups become gradually reduced to form steps 80, 82 and 84. Furthermore, at the steps there are provided secondary return conveyors IIA, IIIA, IVA, comprised of driven rollers which return excess packages to a main return conveyor 90, which in turn conveys the packages to a secondary return conveyor 92. The secondary return conveyor 92 returns the packages to the first (upstream) conveyor section I. Hence, all excess packages are recycled to prevent the system from being overwhelmed.

In particular, excess packages traveling off the step 80 will move onto the secondary return conveyor IIA; packages traveling off the step 82 will move onto the secondary return conveyor IIIA; packages traveling off the step 84 will move onto the secondary return conveyor IVA. Additional secondary conveyors 100, 102, 104 are provided for conveying excess packages from the conveyor sections V, VI, the removal conveyor 19, and flow control conveyor 21. Those secondary return conveyors 100, 102, 104 feed excess packages to the main return conveyor 90. It will be appreciated that the secondary return conveyors and secondary conveyors not only serve to return excess packages back to the main return conveyor, but they also increase the overall conveyor area to enable the excess packages to be handled. To summarize, the widths of the singulator conveyor sections have been reduced in accordance with the desired capacity using the following formula: singulator capacity× avg. area per parcel÷conveyor speed=conveyor width. Excess packages will move onto the secondary return conveyors, rather than traveling to the discharge end of the singulator conveyor where they would be disposed in side-by-side relationship with single-file packages riding against the side wall 32. It will be appreciated that the greater the number of such side-by-side situations increases the chance for side-by-side packages to pass through the conveyor system to a scanner. Thus, the present invention reduces the likelihood for packages to pass through the system in side-by-side relationship.

Rather, there is less likelihood that the package-removal apparatus 19 will become jammed by the excessive number of packages.

Those principles are also embodied in a second preferred embodiment of the invention depicted in FIGS. 3–5. That embodiment includes a singulator conveyor section 150 similar to the section 12 described in connection with FIG. 2. In this case, however, the singulator conveyor forms only two steps 152, 154 for returning excess packages. Furthermore, instead of employing secondary conveyors for receiving excess packages from the steps, inclined chutes 156, 158, 160 are employed upon which the excess packages can gravitate onto a main return conveyor 170 which comprises a series of driven belts 172, 174, 176, 178. The belts 172, 176, 178 are horizontally oriented, and the belt 174 is inclined upwardly from the belt 172 to the belt 176. Extending diagonally across the belt 178 is a diverter plate or plow diverter 180 which diverts, to the inlet end of the singulator conveyor 150, all packages being conveyed along the belts 176, 178. It will be appreciated that the diverter plate 180 eliminates the need for the return conveyor 92 of the earlier described embodiment of the invention.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A conveyor system for arranging randomly oriented articles into a single file traveling in a longitudinal direction, comprising:

a frame forming a vertical side wall;

a singulator conveyor section including a plurality of driven rollers upon which the articles ride, the rollers driven about stationary axes of rotation and arranged in longitudinally successive groups, with the rollers of each group being driven at a faster speed than a preceding group, the axes being skewed to urge the articles in a direction having a longitudinal component directed toward a conveyor discharge end, and a lateral component directed toward the side wall, the rollers including inside ends disposed proximate the side wall, and outside ends disposed remote from the side wall, the rollers with stationary axes extending continuously from an inlet end of the singulator conveyor section to the conveyor discharge end thereof, some of the rollers being of shorter width than respective preceding rollers to form steps between such rollers;

a secondary return portion arranged at said steps for guiding excess packages in a generally lateral direction away from said side wall; and a driven main return conveyor arranged to receive packages from said secondary return portion for returning the packages to the inlet end of said singulator conveyor section.

2. The conveyor system according to claim 1, wherein said secondary return portion comprises a plurality of driven secondary return conveyors disposed at respective ones of said steps.

3. The conveyor system according to claim 2, wherein at least some of said secondary return conveyors comprise driven rollers rotatable about stationary axes of rotation.

4. The conveyor system according to claim 2, wherein said driven main return conveyor extends parallel to said singulator conveyor section and is driven in a direction opposite thereto, said secondary return conveyors extending from said steps to said main return conveyor.

5. The conveyor system according to claim 1, wherein said main return conveyor is arranged to convey excess packages in a longitudinal direction parallel to and opposite said longitudinal direction in which packages are conveyed by said singular conveyor section.

6. The conveyor system according to claim 1, wherein said secondary return portion comprises at least one driven secondary conveyor.

7. The conveyor system according to claim 1, wherein said secondary return portion guides excess packages in a direction substantially perpendicular to said singulator conveyor section.

8. The conveyor according to claim 1 wherein said secondary return portion comprises a plurality of chutes disposed at respective ones of said steps.

9. The conveyor according to claim 1 wherein the driven main return conveyor includes a diverter plate extending diagonally across a downstream end thereof for diverting packages from said downstream end to said upstream end of said singulator conveyor section.

* * * * *